United States Patent
Hung et al.

(10) Patent No.: US 10,372,856 B2
(45) Date of Patent: Aug. 6, 2019

(54) OPTIMIZING CONSTRAINT SOLVING BY REWRITING AT LEAST ONE BIT-SLICE CONSTRAINT

(71) Applicant: Synopsys, Inc., Mountain View, CA (US)

(72) Inventors: Ngai Ngai William Hung, San Jose, CA (US); Qiang Qiang, Santa Clara, CA (US); Guillermo R. Maturana, Berkeley, CA (US); Jasvinder Singh, San Jose, CA (US); Dhiraj Goswami, Wilsonville, OR (US)

(73) Assignee: SYNOPSYS, INC., Mountain View, CA (US)

( * ) Notice: Subject to any disclaimer, the term of this patent is extended or adjusted under 35 U.S.C. 154(b) by 933 days.

(21) Appl. No.: 14/881,029

(22) Filed: Oct. 12, 2015

(65) Prior Publication Data

US 2016/0034624 A1    Feb. 4, 2016

Related U.S. Application Data (62) Division of application No. 12/967,294, filed on Dec. 14, 2010, now Pat. No. 9,195,634.

(Continued)

(51) Int. Cl.
*G06F 17/50* (2006.01)
*G06F 17/11* (2006.01)
*G06F 7/58* (2006.01)

(52) U.S. Cl.
CPC .......... *G06F 17/5045* (2013.01); *G06F 7/582* (2013.01); *G06F 17/11* (2013.01); *G06F 2217/06* (2013.01)

(58) Field of Classification Search
CPC .......... G06F 7/5045; G06F 7/582; G06F 17/11
See application file for complete search history.

(56) References Cited

U.S. PATENT DOCUMENTS

2002/0138812 A1*  9/2002  Johannsen ............ G06F 17/504
                                                          716/103
2005/0039077 A1    2/2005  Iyer

OTHER PUBLICATIONS

Nathan Kitchen et al., "Stimulus generation for constrained random simulation," 2007, IEEE International Conference on Computer-Aided Design 2007, pp. 258-265.*

(Continued)

*Primary Examiner* — Kamini S Shah
*Assistant Examiner* — Russ Guill
(74) *Attorney, Agent, or Firm* — Park, Vaughan, Fleming & Dowler LLP; Laxman Sahasrabuddhe (57) ABSTRACT

Methods and apparatuses are described for assigning random values to a set of random variables so that the assigned random values satisfy a set of constraints. A constraint solver can receive a set of constraints that is expected to cause performance problems when the system assigns random values to the set of random variables in a manner that satisfies the set of constraints. For example, modulo constraints and bit-slice constraints can cause the system to perform excessive backtracking when the system attempts to assign random values to the set of random variables in a manner that satisfies the set of constraints. The system can rewrite the set of constraints to obtain a new set of constraints that is expected to reduce and/or avoid the performance problems. The system can then assign random values to the set of random variables based on the new set of constraints.

9 Claims, 6 Drawing Sheets

Related U.S. Application Data (60) Provisional application No. 61/417,754, filed on Nov. 29, 2010.

(56) References Cited

OTHER PUBLICATIONS

Spear et al. "SystemVerilog for Verification A Guide to Learning the Testbench Language Features" 2008, second edition, Springer, pp. 161-162, 195.
Spear et al. "SystemVerilog for Verification A Guide to Learning the Testbench Language Features" 2006, Springer, pp. 135-182.
Koelbl et al. "Solver technology for system-level to RTL equivalence checking", 2009, Design, Automation & Test in Europe Conference & Exhibition 2009, six pages.
"AVR Freaks," 2006, http://www.avrfreaks.net, five pages.
Ganai et al. "Efficient decision procedure for bounded integer non-linear operations using SMT (LIA)," 2009, in H. Chockler et al., HVC 2008, pp. 68-83.
Brinkmann et al. "RTL—Datapath verification using integer linear programming," 2002, Proceedings of the 15th Internafional Conference on VLSI Design, six pages.
Kroening et al. "Bit Vectors," 2008, in "Decision Procedures," Springer, pp. 149-170.
Boute et al. "The Euclidean Definition of the Functions div and mod," 1992, ACM Transactions on Programming Languages and Systems, vol. 14, No. 2, pp. 127-144.

\* cited by examiner

$$C(a,b,c) = \bar{a} \cdot b \cdot c + a \cdot \bar{b} \cdot c + a \cdot b \cdot \bar{c}$$

OPTIMIZING CONSTRAINT SOLVING BY REWRITING AT LEAST ONE BIT-SLICE CONSTRAINT

RELATED APPLICATION

This application is a divisional of, and claims priority to, U.S. application Ser. No. 12/967,294, having same inventors, and filed on 14 Dec. 2010, the contents of which are herein incorporated by reference in their entirety for all purposes. U.S. application Ser. No. 12/967,294 claims priority to U.S. Provisional Application No. 61/417,754, by the same inventors, filed on 29 Nov. 2010, the contents of which are herein incorporated by reference in their entirety for all purposes.

BACKGROUND

Technical Field

This disclosure generally relates to constraint solvers. More specifically, this disclosure relates to methods and apparatuses for rewriting constraints.

Related Art

The importance of circuit verification cannot be over-emphasized. Indeed, without circuit verification it would have been impossible to design complicated integrated circuits which are commonly found in today's computing devices.

Constrained random simulation methodologies have become increasingly popular for functional verification of complex designs, as an alternative to directed-test based simulation. In a constrained random simulation methodology, random vectors are generated to satisfy certain operating constraints of the design. These constraints are usually specified as part of a test-bench program. A test-bench automation tool (TBA) uses the test-bench program to generate random solutions for a set of random variables, such that a set of constraints over the set of random variables is satisfied. These random solutions can then be used to generate valid random stimulus for the Design Under Verification (DUV). This stimulus is simulated using simulation tools, and the results of the simulation are typically examined within the test-bench program to monitor functional coverage, thereby providing a measure of confidence on the verification quality and completeness.

Constraint solvers are typically used to generate random vectors that satisfy the set of constraints. The basic functionality of a constraint solver is to solve the following constraint satisfaction problem: given a set of random variables and a set of constraints, assign a set of random values to the set of random variables that satisfy the set of constraints. For better software maintenance and quality, the solutions generated by the constraint solver need to be reproducible and deterministic. Further, since users typically require good coverage for the random simulation, the constraint solutions also need to satisfy a user provided distribution.

Unfortunately, the constraint satisfaction with desired solution distribution problem is NP-hard. Logic simulation, on the other hand, usually scales linearly with the size of the design. As a result, the speed of stimulus generation usually lags far behind the speed at which the stimulus is used in the simulation. Hence, it is desirable to improve performance of a constraint solver because it can significantly improve the overall performance of constrained random simulation tools.

SUMMARY

Embodiments described in this disclosure provide methods and apparatuses for assigning random values to a set of random variables so that the assigned random values satisfy a set of constraints. Each constraint can be defined over one or more random variables from the set of random variables.

Specifically, a system (e.g., a constraint solver) can receive a set of constraints that is expected to cause performance problems when the system attempts to assign random values to the set of random variables in a manner that satisfies the set of constraints. For example, the set of constraints may be expected to cause the system to perform excessive backtracking when the system attempts to assign random values to the set of random variables in a manner that satisfies the set of constraints. As another example, the set of constraints may be expected to cause the system to use an impracticably large amount of memory and/or processing resources when the system attempts to assign random values to the set of variables in a manner that satisfies the set of constraints. In some embodiments, the system can rewrite the set of constraints to obtain a new set of constraints which is equivalent to the original set of constraints, but which is expected to reduce and/or avoid the performance problems. The system can then assign random values to the set of random variables based on the new set of constraints. In this disclosure, unless otherwise stated, the term "based on" means "based solely or partly on."

In some embodiments, the system creates a representation of the set of constraints (e.g., a word-level circuit or a binary decision diagram), and uses the representation to assign random values to the random variables. In some embodiments, the system can rewrite the set of constraints to obtain a new set of constraints, and then create a representation based on the new set of constraints. In other embodiments, the system can create a representation based on the original set of constraints, and modify the representation so that the modified representation represents the new set of constraints.

In some embodiments, the system can receive a set of constraints which includes one or more modulo constraints that use a modulo operator. A modulo constraint can cause the system to perform excessive backtracking because the system may not be able to perform complete implication for modulo operators. To reduce the amount of backtracking, some embodiments can rewrite one or more modulo constraints using non-modulo operators. The new set of constraints can then be used to assign random values to the set of random variables.

In some embodiments, the system can determine whether multiple modulo constraints include the same modulo expression. If so, the system can reuse the same set of random variables (instead of using different sets of random variables) to rewrite the modulo expression in the multiple modulo constraints.

In some embodiments, the system can receive a set of constraints which includes one or more bit-slice constraints. Each bit-slice constraint can include one or more bit-slices of one or more random variables. The system can then rewrite the set of constraints to obtain a new set of constraints by: (1) defining one or more auxiliary random variables, wherein each auxiliary random variable represents a non-overlapping bit-slice of a random variable; and (2) rewriting one or more bit-slice constraints using the one or more auxiliary random variables. The system can then assign random values to the set of random variables based on the new set of constraints. Specifically, the system can assign random values to the one or more auxiliary random variables, and determine values for the original random variables by concatenating one or more auxiliary random variables.

The system can use a cost function that has multiple cost components to identify important random variables and/or constraints. In some embodiments, the system can analyze the set of constraints to identify a set of outlier random variables in the set of random variables. According to one definition, an outlier random variable is a random variable such that at least one cost component value for the random variable falls outside a pre-defined range of values. For example, the system may determine an average cost component value based on the cost component values for all random variables. Next, the system can define a range of cost component values around the average cost component value that is considered to be normal. Any random variable whose cost component value falls outside this range can be identified as an outlier random variable.

Once the outlier random variables have been identified, they can be used for a variety of purposes. In some embodiments, the outlier random variables can be used to identify constraints that are candidates for being rewritten. In some embodiments, the outlier random variables can be used for assigning random values to the set of random variables. For example, the system may assign random values to the outlier random variables before assigning values to other random variables.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
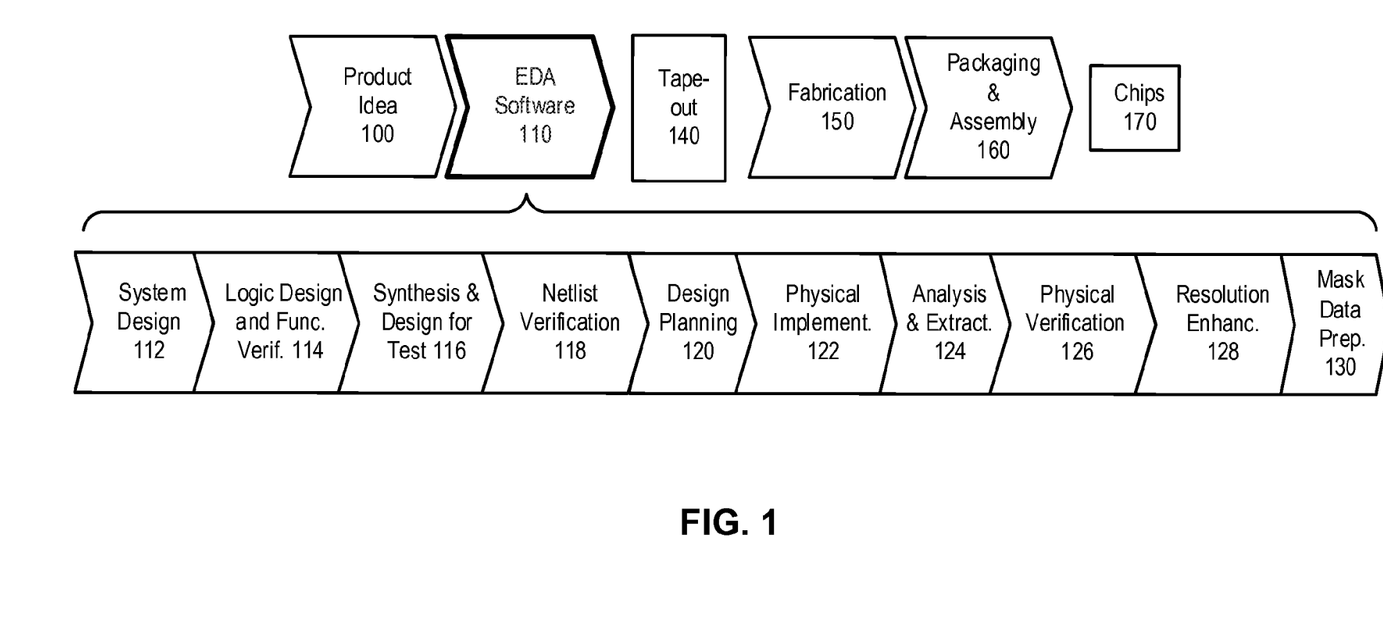
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out 140 for production of masks to produce finished chips.

Constraint Solvers

Some embodiments described in this disclosure use constraint solvers that are based on ATPG (Automatic Test Pattern Generation) or BDDs (Binary Decision Diagrams). Unlike BDD-based constraint solvers, ATPG-based constraint solvers do not guarantee a uniform distribution across the solution space. However, the worst-case runtime of a BDD-based constraint solver can be exponential in the size of the input problem. ATPG-based constraint solvers typically require less memory than BDD-based solvers. Although embodiments have been described in the context of these two constraint solvers, the general principles defined herein may be applied to other constraint solvers without departing from the spirit and scope of the present disclosure.

Some embodiments described in this disclosure use an ATPG-based constraint solver that creates a word-level circuit model to represent the constraints and uses a word-level value system to represent possible values for all nodes in this model. This word-level value system may use intervals and ranges to represent multiple values in a compact form. For example, let "a" be a 4 bit unsigned variable. Independent of the constraints on "a," we can say that the possible values that "a" can have are {0:15}, i.e., from 0 to 15. Note that this compactly represents multiple values, without explicitly enumerating all the values. This representation can be referred to as an interval.

Suppose the constraint "a !=7" is imposed on variable "a." This constraint restricts the values "a" can have to {0:6}, {8:15}. Such a "list of intervals" can be referred to as a range. If another constraint, "a>2," is added, the range value that variable "a" can take is further restricted to {3:6}, {8:15}. A constraint problem that is based on these constraints can be stated as follows: determine random values for variable "a," such that all the constraints on variable "a" are satisfied. The above-described constraint problem can be represented by the following lines of code:

```
rand bit [3:0] a;
constraint cons1 {
    a != 7;
    a > 2;
}
```

Figure 2:
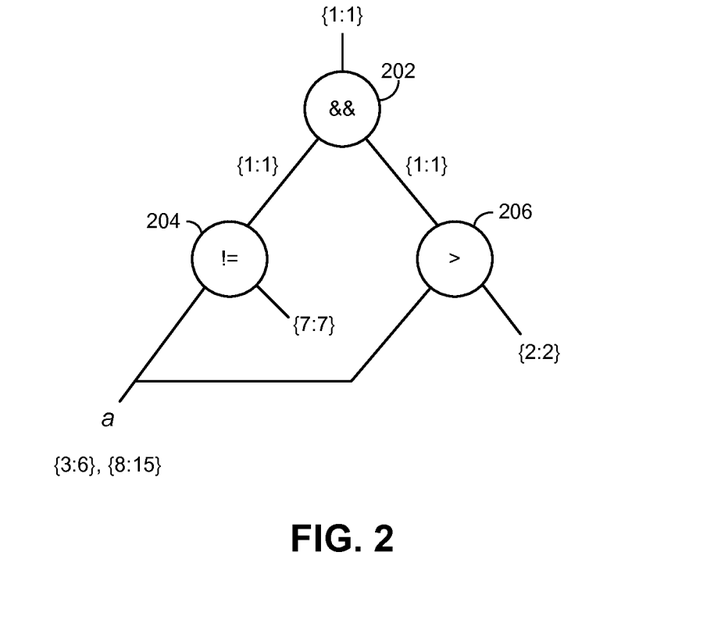
FIG. 2 illustrates a word-level circuit that an ATPG-based constraint solver may create for a constraint problem in accordance with some embodiments described in this disclosure.

FIG. 2 illustrates a word-level circuit that an ATPG-based constraint solver may create for a constraint problem in accordance with some embodiments described in this disclosure.

The ATPG-based constraint solver used by some embodiments described in this disclosure may create a word-level circuit that includes nodes 202, 204, and 206. Node 202 can correspond to conjunction of the set of constraints, node 204 can correspond to constraint "a !=7," and node 206 can correspond to constraint "a>2." The "&&" operator shown inside node 202 indicates that both constraints need to be satisfied.

After creating the word-level circuit model, the ATPG-based constraint solver can perform static implications to refine the range values on each node in the circuit. The result of performing static implications is also shown in FIG. 2. That is, the range value shown next to each node in the circuit is the result of performing static implications. After performing static implications, the ATPG-based constraint solver can perform static learning to further refine the range values. Then the ATPG-based constraint solver can perform random ATPG to pick and try values for the unassigned random variables.

For example, in the word-level circuit illustrated in FIG. 2, suppose the ATPG-based constraint solver picks a random value "5" for variable "a." Once this value is picked, the constraint solver can invoke its implication engine to incrementally update the range values in the circuit and to determine if this value assignment to variable "a" results in any conflicts. For the value "5," the implication engine will evaluate the "!=" comparator node and the ">" comparator node to determine that there is no conflict. Therefore, the assignment "a=5" is determined as a legal random assignment that satisfies all the constraints. Note that a constraint solver can remember the evaluation result generated by a node, and reuse the evaluation result if the input values to the node have not changed.

If a conflict is encountered during the implication process, the constraint solver can backtrack on the last assigned variable and try other value assignment until the constraint solver determines an assignment that does not result in any conflicts (if such a solution exists). Due to backtracking, the constraint solver may need to invoke its implication engine repeatedly, which can end up consuming a majority of the constraint solver's computation time. Further details of an ATPG-based constraint solver can be found in U.S. Pat. No. 7,243,087, entitled "Method and Apparatus for Solving Bit-Slice Operators," by inventor Mahesh A. Iyer, issued on Jul. 10, 2007, the contents of which are herein incorporated by reference. Some embodiments described in this disclosure are directed to improve the performance of ATPG-based constraint solvers.

In some embodiments described in this disclosure, a constraint solver represents the set of constraints in a canonical representation (e.g., a BDD), and then uses the canonical representation to determine solutions to the set of constraints. For example, if the set of constraints is represented by a BDD, each path in the BDD from the root node to the terminal node that corresponds to the value "1" can be associated with a value assignment that satisfies the set of constraints.

Figure 3A:
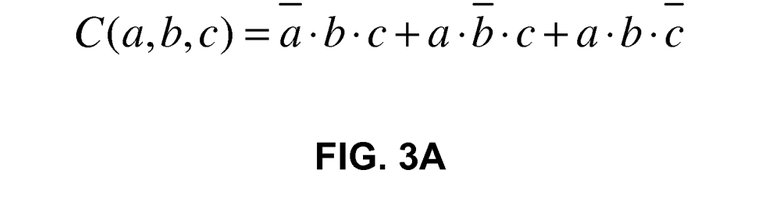
FIG. 3A illustrates a constraint in accordance with some embodiments described in this disclosure.

FIG. 3A illustrates a constraint in accordance with some embodiments described in this disclosure. The constraint illustrated in FIG. 3A is a Boolean function over three variables: "a," "b," and "c." The variables may model signals in the DUV, e.g., the variable "a" may be a random variable that represents the logic state of an input signal in the DUV. Variable "b" may be a state variable that represents the output of a logic gate in the DUV.

Figure 3B:
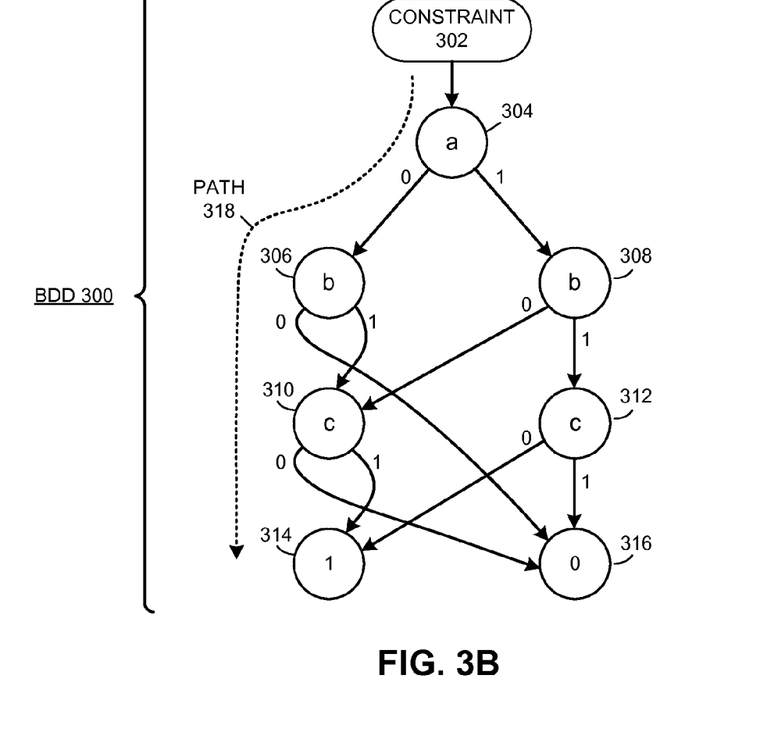
FIG. 3B illustrates a BDD in accordance with some embodiments described in this disclosure.

FIG. 3B illustrates a BDD in accordance with some embodiments described in this disclosure.

BDD 300 can represent the constraint shown in FIG. 3A. BDD 300 includes nodes 302, 304, 306, 308, 310, 312, 314, and 316. Node 302 can be the root node which can be used to represent the entire constraint. Node 304 can be associated with variable "a," nodes 306 and 308 can be associated with variable "b," and nodes 310 and 312 can be associated with variable "c." Node 314 can represent the Boolean value "TRUE" or "1" for the Boolean function. In other words, node 314 can represent a situation in which the constraint has been satisfied. In contrast, node 316 can represent the Boolean value "FALSE" or "0." In other words, node 316 can represent a situation in which the constraint has not been satisfied.

The directed edges in BDD 300 can represent a value assignment to a variable. For example, the directed edge between nodes 304 and 306 can be associated with assigning value "0" to the random variable "a." Similarly, the directed edge between nodes 308 and 312 can be associated with assigning value "1" to the state variable "b."

A directed path in a BDD from the root node, e.g., node 302, to the terminal node for the Boolean value "TRUE," e.g., node 314, can correspond to a value assignment to the variables that satisfies the set of constraints which is being represented by the BDD, e.g., the constraint shown in FIG. 3A. For example, path 318 begins at node 302 and terminates at node 314. The value assignments associated with path 318 are: a=0, b=1, and c=1. It will be evident that this value assignment causes the Boolean function shown in FIG. 3A to evaluate to "TRUE."

Once the system builds the BDD, it can generate constrained random stimulus by determining all distinct paths from the root node to the terminal node associated with the "TRUE" value, and by randomly selecting a path from the set of all distinct paths.

Note that BDDs are only one of the many different types of canonical representations that can be used to generate the random stimulus. A canonical representation of a logical function (e.g., a constraint) can generally be any representation which satisfies the following property: if two logical functions are equivalent, their canonical representations will be the same as long as the same variable ordering (or an equivalent characteristic) is used while constructing the canonical representation. Examples of canonical representations include, but are not limited to, binary decision diagrams, binary moment diagrams, zero-suppressed binary decision diagrams, multi-valued decision diagrams, multiple-terminal binary decision diagrams, and algebraic decision diagrams.

Some embodiments described in this disclosure provide methods and apparatuses for improving the performance of constraint solvers (e.g., BDD-based constraint solvers) that represent the set of constraints using a canonical representation.

Modulo Constraints

One approach for improving the performance of constraint solvers is to reduce the amount of backtracking. Specifically, if the system can increase the effectiveness of the implication engine, it can further restrict the value ranges for the variables, which can reduce the occurrence of conflicts (and therefore backtracking) when a random value is chosen for a variable.

Figure 4A:
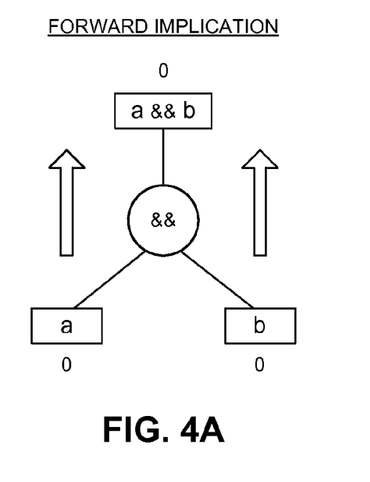
FIG. 4A illustrates an example of forward implication in accordance with some embodiments described in this disclosure.

FIG. 4A illustrates an example of forward implication in accordance with some embodiments described in this disclosure. As shown in FIG. 4A, if either variable "a" or variable "b" is known to be zero, then forward implication can be used to conclude that the logical AND operation of variables "a" and "b" (shown as "a && b" in FIG. 4A) will also be equal to zero.

Figure 4B:
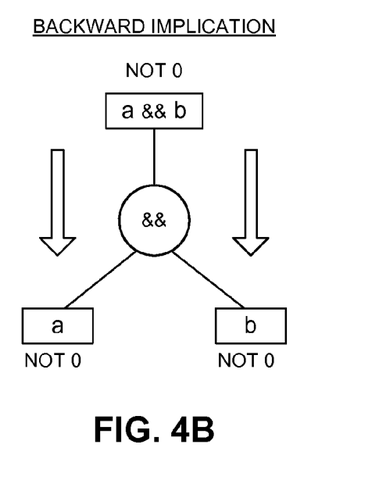
FIG. 4B illustrates an example of backward implication in accordance with some embodiments described in this disclosure.

FIG. 4B illustrates an example of backward implication in accordance with some embodiments described in this disclosure. As shown in FIG. 4B, if the logical AND operation of variables "a" and "b" is known to be non-zero, then backward implication can be used to conclude that the values of "a" and "b" cannot be zero.

As shown in FIGS. 4A and 4B, implication can be performed for the logical AND operator. Similarly, implication can also be performed for other standard logical operators (e.g., logical OR, logical EXOR, etc.) and standard arithmetic operations (e.g., addition, subtraction, multiplication, etc.).

The modulo operator (which is denoted by the percent symbol "%" in this disclosure) is often used in constraints. However, conventional ATPG-based constraint solvers do not perform implication for modulo operators. As a result, a set of constraints that include a modulo operator can cause a large amount of backtracking in conventional ATPG-based constraint solvers.

Some embodiments of the present invention provide methods and apparatuses to facilitate performing implication for modulo constraints. Specifically, some embodiments of the present invention rewrite a set of constraints that use the modulo operator so that the rewritten set of constraints use standard logical and arithmetic operators. Implication can be performed more effectively on the set of rewritten constraints because they only use logical and arithmetic operators on which implication can be performed effectively.

Some embodiments use different approaches for rewriting the modulo constraint "expr1% expr2==expr3" depending on the value of "expr2." If the value of expression "expr2" is a power of two, then some embodiments rewrite the modulo constraint using a bitwise AND operator. On the other hand, if the value of expression "expr2" is not a power of two, then some embodiments rewrite the modulo constraint using standard logical and arithmetic operators.

When the expression "expr2" is a power of two, the modulo operation is equivalent to a bitwise AND operation. Specifically, the expression "expr1% expr2" can be rewritten as "expr1 & bitmask," where "bitmask" is equal to "expr2−1" if expression "expr2" is greater than zero, and "−expr2−1" if the expression "expr2" is less than zero. In other words, "bitmask" is equal to "|expr2|−1," if expression "expr2" is not equal to zero. If expression "expr2" is equal to zero, the modulo operator returns an error. Replacing a modulo operator with a bitwise AND operator can substantially speedup the constraint solver because the implication engine is capable of performing implications effectively on the bitwise logical AND operator. This can substantially reduce number of incorrect decisions in the ATPG decision procedure. Further, in a BDD-based constraint solver, the bitwise AND operator can prevent the BDD from becoming unmanageably large when the BDD-based constraint solver builds the BDD for the set of constraints (if the modulo constraint had not been rewritten, it could have caused the BDD to become unmanageably large).

When "expr2" is not necessarily a power of two, the modulo constraint can be rewritten as a set of constraints that uses standard logical and arithmetic operators, but do not use the modulo operator. Specifically, the constraint "expr1% expr2==expr3" can be replaced by the constraints "(expr1==q*expr2+r) && (|r|<|expr2|)" and "r==expr3," where "q" and "r" are new random variables.

The following piece of code illustrates a modulo expression in which "expr2" is a power of two.

rand int a;
a % 4==0;

This piece of code can be rewritten using a bitwise AND operation as follows.

rand int a;
a & 3==0;

The following piece of code illustrates a modulo expression in which "expr2" is not necessarily a power of two.

rand int a, b;
a % b==0;

This piece of code can be rewritten using standard logical and arithmetic operators, but without using the modulo operator, as follows.

rand int a, b;
rand int q, r;
a==(b*q+r) && (|r|<|b|);
r==0;

If the set of constraints includes multiple modulo constraints that have the same dividend and divisor (i.e., the same "expr1" and "expr2"), then the same random variables can be used for rewriting these modulo constraints. For example, the system can keep track of the dividends and divisors for each modulo constraint (e.g., by using a hash table). If a modulo constraint with the same arguments is encountered again, the system can reuse the random variables that were used for rewriting the previous instance of the modulo constraint. Reusing the same random variables can enable a common sub-expression identification module to remove redundant or duplicate constraints. The data structure (e.g., hash table) that is used for keeping track of the dividends and divisors can be deleted after the constraints have been rewritten to reclaim the memory that was used by the data structure.

Modulo constraints with constraint guards can also be rewritten in a form that only uses non-modulo operators. If the modulo expression appears on the left hand side of the implication, the modulo expression can be rewritten as explained above. For example, the modulo expression "expr1% expr2" in the constraint "(expr1% expr2)→expr3" can be rewritten as explained above.

However, if the modulo expression appears on the right hand side of the implication, the system may use a heuristic to determine whether or not to rewrite the constraint. For example, in the modulo constraint "expr3→(expr1% expr2)," if the guard expression "expr3" is known to be "FALSE," the modulo expression does not need to be evaluated, and therefore, does not need to be rewritten.

In some embodiments, the system creates an internal node to handle cases in which multiple modulo constraints share the same modulo expression. For example, the following piece of code illustrates multiple modulo constraints that include a constraint guard and that share a modulo expression.

rand int c1, c2, a, b;
 c1→a % b==5;
 c2→a % b==17;

This piece of code can be rewritten using non-modulo operators as shown below. Note that the rewritten constraints instruct an ATPG-based constraint solver to create virtual internal node "tmp" so that the two modulo constraints can share a single evaluation of the expression "(a==(b*q+r) && (|r|<|b|))."

rand int c1, c2, a, b;
 rand int q, r;
 virtual internal node tmp;
 tmp=(a==(b*q+r) && (|r|<|b|));
 c1→tmp==1;
 c2→tmp==1;
 c1→r==5;
 c2→r==17;

The system may determine whether to rewrite guarded modulo constraints based on one or more heuristics. Specifically, if the number of additional random variables and/or constraints that are required in the rewrite is greater than a given threshold, the system may decide not to rewrite the guarded modulo constraints. Further, if the constraint guard condition is expected to be "FALSE" most of the time, the modulo constraint on the right hand side of the implication will be ignored, and so the rewrite is not needed.

After the rewrite, common sub-expression extraction may not be able to identify duplicate constraints because of the uncertainty of the guard condition. Therefore, rewriting each and every modulo constraint that has a constraint guard can unnecessarily increase the complexity of the constraint problem. In view of this, some embodiments described in this disclosure monitor the frequency with which a particular modulo expression (e.g., "a % b") appears in the set of constraints. If the modulo expression appears more than a certain amount, the system may decide to rewrite the modulo constraints that contain that particular modulo expression. Further, some embodiments may monitor the size of the constraint problem (e.g., number of variables and/or constraints). If the constraint problem is relatively small, the system may decide to skip rewriting the modulo constraints.

Figure 5:
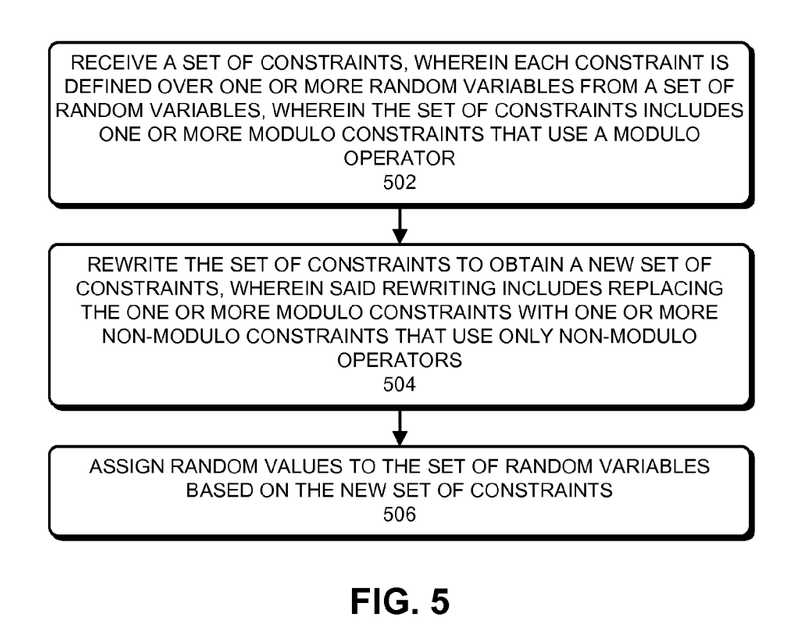
FIG. 5 presents a flowchart that illustrates a process for rewriting modulo constraints in accordance with some embodiments described in this disclosure.

FIG. 5 presents a flowchart that illustrates a process for rewriting modulo constraints in accordance with some embodiments described in this disclosure.

The process can begin by receiving a set of constraints, wherein each constraint is defined over one or more random variables from a set of random variables, wherein the set of constraints includes one or more modulo constraints that use a modulo operator (block 502).

Next, the system can rewrite the set of constraints to obtain a new set of constraints, wherein said rewriting includes replacing the one or more modulo constraints with one or more non-modulo constraints that use only non-modulo operators (block 504).

In some embodiments, the system can determine whether multiple modulo constraints include the same modulo expression. If so, the system can use the same set of random variables to rewrite the modulo expression in the multiple modulo constraints. In some embodiments, the system can identify modulo constraints of the type "expr3→(expr1% expr2)." Next, the system can determine whether the expression "expr3" is expected to evaluate to "TRUE" or "FALSE." If the expression "expr3" is expected to evaluate to "FALSE," the system may skip rewriting the modulo constraint "expr3→(expr1% expr2)."

Once the set of constraints has been rewritten, the system can then assign random values to the set of random variables based on the new set of constraints (block 506). In some embodiments the system can create a word-level circuit based on the new set of constraints. In other embodiments, the system can create a word-level circuit based on the original set of constraints, and modify the word-level circuit so that the modified word-level circuit represents the new set of constraints.

Bit-Slice Constraints

The random variables that are used in the set of constraints are usually defined as integers, which are essentially bit vectors. For example, each of the following random variables can be treated as bit vectors.

rand int a; // 32-bit signed bit vector
 rand bit [79:0] b; // 80-bit signed bit vector
 rand byte c; // 8-bit unsigned bit vector If a constraint uses only some of the bits (but not all the bits) of a variable, the subset of bits is called a "bit-slice" and the variable is called a "base node". For example, the following lines of code illustrate a bit-slice constraint.

```
class TestBenchClass;
rand bit [31:0] x;
constraint cc {
    x [31:12] == x [19:0];
    x >= 128;
}
endclass
```

In the above example, x[31:12] and x[19:0] are bit-slices of base node variable x. The notation v[n:m] represents a bit-slice that includes bits m through n in variable v. Note that bit-slices x[31:12] and x[19:0] have a common bit-slice x[19:12].

ATPG-based constraint solvers usually perform a large amount of backtracking when solving a set of constraints that use bit-slices, especially if some of the bit-slices overlap. This is primarily due to two reasons. First, the implications for constraint expressions that use bit-slices are incomplete because bit-level values are propagated on a word-level model. Forward implication from the base node to a bit-slice node and the backward implication from a bit-slice node to the base node both return an approximate value range. In most cases, the propagated value is the most conservative value that the node can have. As a result, static implication and static learning is not very effective in narrowing down the search space for the bit-slice nodes.

Second, some ATPG-based constraint solvers may use overlapping bit-slices as decision variables instead of using the base node as the decision variable. For example, in the piece of code shown above, an ATPG-based constraint solver may treat bit-slices x[31:12] and x[19:0] as decision variables and independently and randomly assign values to them. However, making independent random value assignments to these two bit-slices is likely to cause a conflict because these two bit-slices overlap (the common portion is bit-slice x[19:12]), which, in turn, causes the ATPG-based constraint solver to backtrack.

Bit-slice constraints often appear in processor designs. Furthermore, any packed data structure is essentially a bit vector, and members of the packed data structure are essentially bit-slices. Therefore, improving constraint solver performance for bit-slice constraints is important.

Some embodiments described in this disclosure provide methods and apparatuses for improving constraint solver performance for bit-slice constraints. Specifically, some embodiments rewrite bit-slice constraints so that the amount of backtracking required to generate random variable assignments based on the set of rewritten constraints is substantially less than the amount of backtracking required to generate random variable assignments based on the original set of constraints.

Some embodiments introduce auxiliary decision variables and rewrite bit-slice constraints in terms of the auxiliary decision variables. Specifically, some embodiments identify non-overlapping partitions in the base node variable based on the bit-slices that appear in the constraints, and define an auxiliary decision variable for each non-overlapping partition. The original bit-slices can then be replaced by the auxiliary decision variables as decision nodes in the word-level circuit. The ATPG-based constraint solver can make decisions on these auxiliary decision variables before deciding the value of the base node variable by concatenating the auxiliary decision variables.

For example, the bit-slice constraint shown above can be rewritten as follows.

```
line 01: class TestBenchClass;
line 02: rand bit [31:0] x;
line 03: rand bit [11:0] aux31_20;
line 04: rand bit [7:0] aux19_12;
line 05: rand bit [11:0] aux11_0;
line 06: constraint cc {
line 07:         aux31_20 == x [31:20];
line 08:         aux19_12 == x [19:12];
line 09:         aux11_0 == x [11:0];
line 10:         x [31:12] == {aux31_20, aux19_12};
line 11:         x [19:0] == {aux19_12, aux11_0};
line 12:         x == {aux31_20, aux19_12, aux11_0};
line 13:         x [31:12] == x [19:0];
line 14:         x >= 128;
line 15: }
line 16: endclass
```

As shown above, three auxiliary random variables "aux31_20," "aux19_12," and "aux11_0" have been added. These auxiliary random variables are marked as decision variables in the word-level circuit that the ATPG-based constraint solver uses to generate random variable assignments.

The auxiliary variables are created based on non-overlapping partitions of the random variable "x." Specifically, variable "x" (which corresponds to the base node) is partitioned into non-overlapping bit-slices based on the boundaries of the bit-slices that are used in the constraints. In the above example, the bit-slices that are used in the constraints are x[31:12] and x[19:0]. The boundaries of these bit-slices are located at bits 31, 19, 12, and 0. Therefore, in some embodiments, the system creates three auxiliary decision variables "aux31_20," "aux19_12," and "aux11_0" that correspond to non-overlapping bit-slices x[31:20], x[19:12], and x[11:0], respectively. The relationship between the auxiliary variables and the corresponding bit-slices is captured by three new equality constraints, as shown in lines 07-09 of the rewritten bit-slice constraint. The original bit-slices x[31:12] and x[19:0] that were used in the original set of constraints are represented as a concatenation of auxiliary variables, as shown in lines 10-11 of the rewritten bit-slice constraint. Random variable x can be represented as a concatenation of auxiliary variables, as shown in line 12 of the rewritten bit-slice constraint.

In general, concatenation performs incomplete implications unless one side of the concatenation operation is fully assigned. Since the auxiliary variables are always assigned before the original slices and the base node variable, complete implications can be performed on the concatenation operations that are introduced in the rewritten set of bit-slice constraints. In this manner, some embodiments enable complete implications for the bit-slice operator and reduce the amount of backtracking required.

In some embodiments, the rewrite can be performed after the ATPG-based constraint solver creates a word-level circuit model and before the ATPG-based constraint solver performs implication. All the input variables that are associated with bit-slice nodes in the word-level circuit model can be statically analyzed and the bit-slice constraints can then be rewritten.

For example, the system can collect bit-slice information by analyzing the set of constraints and create the appropriate bit-slice partitions. Next, the system can generate a set of auxiliary variables from these partitioned slices. The system can then create additional circuitry for the auxiliary variables in the word-level circuit. The additional circuitry can essentially capture the relationship between the auxiliary variables and bit-slices in the original set of constraints. Next, the system can collect information to facilitate random value assignments on the decision variables. Specifically, the system can determine the following information: (1) the number of possible paths between an auxiliary variable and the associated original bit-slices, (2) bit position relationships between an auxiliary variable and the associated base node variable, and (3) initial value ranges for the auxiliary variables. Based on the collected information, the system can determine whether and how to rewrite the bit-slice constraints.

Adding auxiliary variables and constraints can increase the amount of processing performed by the ATPG-based constraint solver. Therefore, some embodiments try to optimize the number and type of auxiliary variables and constraints that are added in certain situations. Some examples of such optimizations are described below.

In some cases, a variable is partitioned into a large number of bit-slices that are only a few bits wide. Such cases are referred to as bit-blasting cases. An example of a bit-blasting case is shown below:

```
rand bit [7:0] x;
constraint c1 {
    x [7] == (x [0] ^ x [1] ^ x [2] ^ x [3] ^ x [4] ^ x [5] ^ x [6]);
}
```

In the above example, the base variable "x" is eight bits long and the constraint has eight bit-slices, each corresponding to a single bit. Without optimization, some embodiments may create eight auxiliary variables (e.g., aux0, aux1, . . . , aux7), eight equality constraints (e.g., x[0]==aux0, x[1]==aux1, . . . , x[7]==aux7), and a seven-level concatenation constraint (e.g., { . . . {{aux7, aux6}, aux5} . . . , aux0}==x). The circuitry that is required to represent the rewritten set of constraints can be substantially larger than the circuitry that is required to represent the original set of constraints. As a result, rewriting the bit-slice constraints can degrade the performance of the ATPG-based constraint solver instead of improving its performance.

For bit-blasting cases, such as the one shown above, some embodiments rewrite the constraints by defining an auxiliary variable that represents multiple bit partitions. For example, the constraint shown above can be rewritten as follows.

```
rand bit [7:0] x;
rand bit [0:0] y;
rand bit [6:0] z;
constraint c1 {
    y [0] == (z [6] ^ z [5] ^ ... ^ z [0]);
    x == {y, z};
    solve y, z before x;
    solve z before y;
}
```

As shown above, two auxiliary variables "y" and "z" are created instead of creating eight auxiliary variables. Circuitry for only one additional constraint is required (note that the "solve before" directive does not require additional circuitry to be built). In the rewritten set of constraints, instead of making decisions on eight bit-slices x[0]-x[7], the system only needs to make decisions on three decision variables: x, y, and z. Due to the "solve before" directives, the variable z is assigned a random value before assigning random values to variables x or y. Because all the bit-slices of z appear in the same constraint and on the same side of the constraint, the values assigned to the bit-slices do not depend on any other variable. In other words, no matter what value is assigned to each bit-slice of z, it would not cause any backtracking. Once the value of z is assigned, the values of y and x can be assigned. Note that the value of x is known because of implication on the concatenation equality once the values of z and y are known. Therefore, no backtracking is performed in the rewritten set of constraints, and only a small amount of additional circuitry is required to represent the rewritten set of constraints.

In some cases, a particular bit-slice may occur much more frequently than other bit-slices in the set of constraints. In such situations, the system can create auxiliary variables that correspond to the bit-slices that appear frequently in the set of constraints.

For example, suppose the following bit-slices of a 64-bit random variable "x" appear in the set of constraints: x[1:0], x[63:32], x[31:24], x[23:19], x[18:16], x[15:12], x[11:2], x[1:1], x[0:0], x[2:0], x[3:0], x[5:2], and x[31:2]. Further, suppose that bit-slices x[31:2] and x[1:0] appear more than ten times in the set of constraints, while the other bit-slices only appear once. The partitions of variable "x" for which auxiliary variables are created are: x[63:32], x[31:24], x[23:19], x[18:16], x[15:12], x[11:6], x[5:4], x[3:3], x[2:2], x[1:1], and x[0:0]. However, if the system does not create special auxiliary variables (as explained below) for bit-slices x[31:2] and x[1:0], the system may require a large amount of backtracking because the value assignments to the partitions may not satisfy the constraints that are defined on the frequently occurring bit-slices.

Therefore, some embodiments identify bit-slices that occur frequently in the set of constraints, and create additional auxiliary variables for these frequently occurring bit-slices. If the frequently occurring bit-slices overlap with one another, then, in some embodiments, the system may create an auxiliary variable for only the bit-slice that appears with the highest frequency.

For example, in the above example, the system may define variables aux31_2 and aux1_0 for the two bit-slices x[31:2] and x[1:0] that appear substantially more frequently than the other bit-slices in the constraints. Specifically, the base node that corresponds to the variable "x" can be partitioned using boundaries of these two frequently occurring bit-slices to obtain bit-slices x[63:32], x[31:2], and x[1:0]. The system can then add the following lines of code based on the additional auxiliary variables that correspond to the frequently occurring bit-slices in the constraints.

aux31_2=={{aux31_24, aux23_19} ... aux2};
aux1_0=={aux1, aux0};
x=={aux63_32, aux31_2, aux1_0};

Note that the equality constraint that equates variable "x" with a concatenation of bit-slices only needs to concatenate three bit-slices instead of concatenating a much larger number of bit-slices had the auxiliary variables for the frequently occurring bit-slices not been defined. The auxiliary variables that correspond to the frequently occurring bit-slices can be represented using only a small amount of additional circuitry. Further, the ATPG-based constraint solver can be directed to solve for the frequently occurring bit-slices first, which can substantially reduce the amount of backtracking.

In some cases, only the bit-slices of a variable are used, and the variable itself is never used in any constraint. The following example illustrates this case.

rand bit[7:0] a, b;
a[5:3]==0;
b[6:2]+1==a[4:0];

In the above example, the variables "a" and "b" are not used in the constraints; only their bit-slices are used. In the word-level circuit, the base node that represents this type of variable (e.g., variables like "a" and "b") only fans out to bit-slice nodes, because the base node is not connected to any constraint. Some embodiments identify such variables in the set of constraints, and do not introduce auxiliary variables that correspond to each bit partition. Instead, the system solves the individual bit-slices first, and then performs a concatenation operation on the bit-slices to obtain the value for the variable. This approach can avoid performing the implication operations through the auxiliary circuitry and reduce the number of decision variables.

For example, in the above example, the system can assign values to bit-slices a[4:0] and a[5:3]. Next, the system can determine the value of bit-slice b[6:2] based on the constraint "b[6:2]+1==a[4:0]." Finally, the system can use the values of bit-slices a[4:0], a[5:3], and b[6:2] to determine values for variables "a" and "b."

Figure 6:
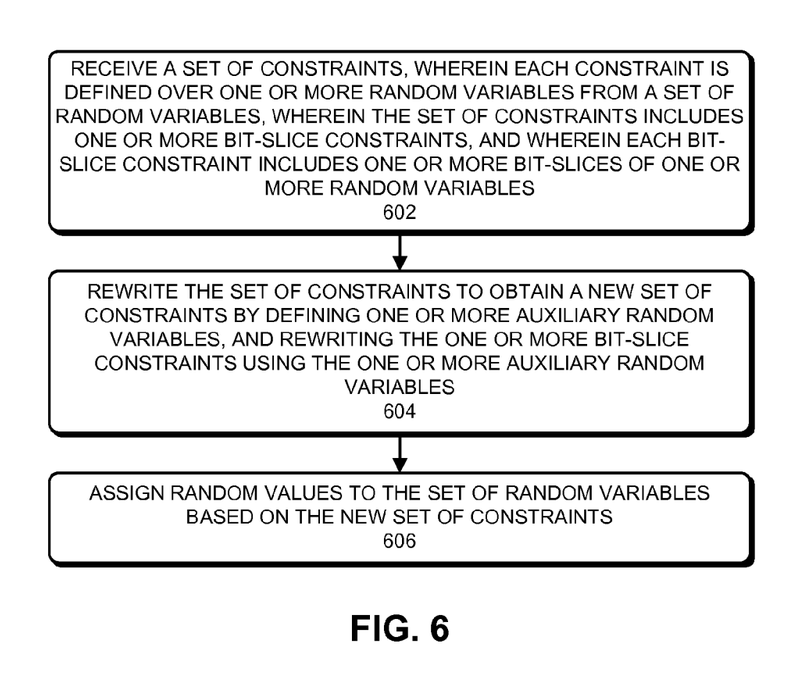
FIG. 6 presents a flowchart that illustrates a process for rewriting bit-slice constraints in accordance with some embodiments described in this disclosure.

FIG. 6 presents a flowchart that illustrates a process for rewriting bit-slice constraints in accordance with some embodiments described in this disclosure.

The process can begin by receiving a set of constraints, wherein each constraint is defined over one or more random variables from a set of random variables, wherein the set of constraints includes one or more bit-slice constraints, and wherein each bit-slice constraint includes one or more bit-slices of one or more random variables (block 602).

The system can then rewrite the set of constraints to obtain a new set of constraints by defining one or more auxiliary random variables, and rewriting the one or more bit-slice constraints using the one or more auxiliary random variables (block 604). Each auxiliary random variable can represent a non-overlapping bit-slice of a random variable. In some embodiments, the system can identify a high-frequency bit-slice of a random variable that occurs more than a pre-defined number of times in the set of constraints. The system can then define a high-frequency auxiliary variable that corresponds to the high-frequency bit-slice of the random variable.

Next, the system can assign random values to the set of random variables based on the new set of constraints (block 606). In some embodiments, the system can begin by assigning random values to the auxiliary variables. Specifically, the system may first assign random values to the auxiliary variables that correspond to the high-frequency bit-slices, and then assign random values to the other auxiliary variables. Next, the system can determine values of the base node variables by concatenating the auxiliary variable values.

Outliers

An ATPG-based constraint solver decides values for random variables (which are represented as nodes in the word-level circuit) and backtracks when a conflict is detected. An important part in this process is to pick an appropriate decision variable. In some ways, this is similar to the decisions that need to be taken during a depth-first search. During a depth-first search, it is advantageous to select variables that can quickly lead to a satisfiable solution. Further, it is desirable to detect conflicts near the root of the search stack. This is because the search space grows exponentially with the depth of the search stack, and if conflicts are not detected near the root, a large amount of processing may be wasted. For these reasons, it is important to select decision nodes judiciously.

Some ATPG-based constraint solvers determine the variable ordering (i.e., the order in which decision nodes are picked) based on a cost function. For example, the higher the cost function value, the earlier the decision node may be picked. In some embodiments, the system determines a cost function based on one or more of the following factors: (1) the type of constraint expressions that are present in the cone of influence of the decision node, (2) the number of constraint expressions that the decision node is involved in, (3) the number of times the decision node was involved in backtracking, and (4) the current ranges of possible values for the decision node.

In some embodiments, the value of the cost function increases when (1) the decision node is involved in a greater number of modulo or bi-slice constraints, (2) the decision node is involved in a larger number of constraints, (3) the decision node is involved in a larger number of backtrackings, and/or (4) the current ranges of possible values for the decision node decreases.

In some embodiments, the ATPG-based constraint solver can use a cost function that has a number of cost components. Each cost component can represent a factor that increases or decreases the importance of picking a decision node early during the depth-first search. For example, a cost component can be related to the number of constraints that a decision variable is involved in.

The cost function can be a weighted sum of the cost components. Once the cost function values for different decision variables have been determined, the system can pick the decision variables based on their cost function values, e.g., by sorting the decision variables in decreasing order based their cost function values.

Since the cost function is a weighted sum of the cost components, the cost function value of two variables can be substantially equal to one another even when their cost components have very different values. For example, suppose the cost function C is equal to 0.2*C1+0.8*C2, where C1 and C2 are cost components. Further, suppose that for random variable "a," the values for C1 and C2 are 10 and 20, respectively, and for random variable "b," the values for C1 and C2 are 86 and 1. The cost function C for both random variables "a" and "b" is equal to 18. In some embodiments, the system may select "a" or "b" in a random order because their cost function values are the same. However, note that the cost component values for random variable "b" are more extreme than those for random variable "a."

In some embodiments, the system identifies random variables that have an outlier cost component value, i.e., the value of the cost component is substantially greater or less than the cost component values for other variables. For example, cost component values that are within two standard deviations from the average cost component value across all variables can be deemed as being within a normal range of values; anything outside this range can be considered to be either substantially greater or less than the average cost component values. The system can then pick these identified random variables earlier or later in the decision process than when they would have been picked if they were picked based only on their cost function values. This approach of identifying outliers and guiding the constraint solver based on the identified outliers can be applied in general to any constraint solver.

For example, a BDD-based constraint solver may apply a sequence of basic BDD logic operations to generate intermediate BDDs, as stepping stones to arrive at the final BDD. Although the final BDD that is computed is the same, different intermediate BDDs may be generated when the individual BDDs are combined in different orders. In some sequences, an intermediate BDD may become impracticably large, i.e., some sequences may cause the intermediate BDD to blow up.

In some embodiments, a cost function can be computed for the individual BDDs to determine a sequence for combining the BDDs so as to avoid intermediate BDD blowup. In these embodiments, the components of the cost function can be used to identify outliers in the individual BDDs. Next, the system can adjust the position of these identified BDDs in the sequence to prevent BDD blowup. Further details of how an intermediate BDD can be computed can be found in U.S. Patent Publication No. 20100191679, entitled "Method and Apparatus for Constructing a Canonical Representation," by inventors Ngai Ngai William Hung, Dhiraj Goswami, and Jasvinder Singh, the contents of which are incorporated by reference herein.

In some embodiments, a BDD-based constraint solver can compute BDDs corresponding to multiple constraints using a single BDD manager, or divide the constraints into two or more groups, each managed by a separate BDD manager. A benefit of managing multiple BDDs using a single BDD manager is that it allows the multiple BDDs to share common sub-trees. However, a drawback is that the multiple BDDs need to have the same variable ordering, which may cause an intermediate BDD to blowup. In some embodiments, a BDD-based constraint solver can identify outlier BDDs, and ensure that no two outlier BDDs share the same BDD manager. Further details of how BDDs can share a BDD manager can be found in U.S. Patent Publication No. 20100275169, entitled "Adaptive State-to-Symbolic Transformation in a Canonical Representation," by inventors Dhiraj Goswami, Ngai Ngai William Hung, Jasvinder Singh, and Qiang Qiang, the contents of which are incorporated by reference herein.

In some embodiments, outliers can be used to determine which constraints to rewrite. In an ATPG-based constraint solver, rewriting a set of constraints can reduce the amount of backtracking, but increase the size of the word-level circuit that is used for assigning random values to the set of variables. Similarly, in a BDD-based constraint solver, rewriting a set of constraints can prevent an intermediate BDD from blowing up, but it may increase the size of the final BDD. In some embodiments, the system can rewrite constraints based on whether the constraints use an outlier random variable. For example, once a constraint solver has determined a set of outlier random variables based on a set of cost function components, the system can identify constraints that use one or more of these outlier random variables. Next, the system can rewrite these constraints in addition to any other constraints that were identified by the constraint solver based on the cost function.

Figure 7:
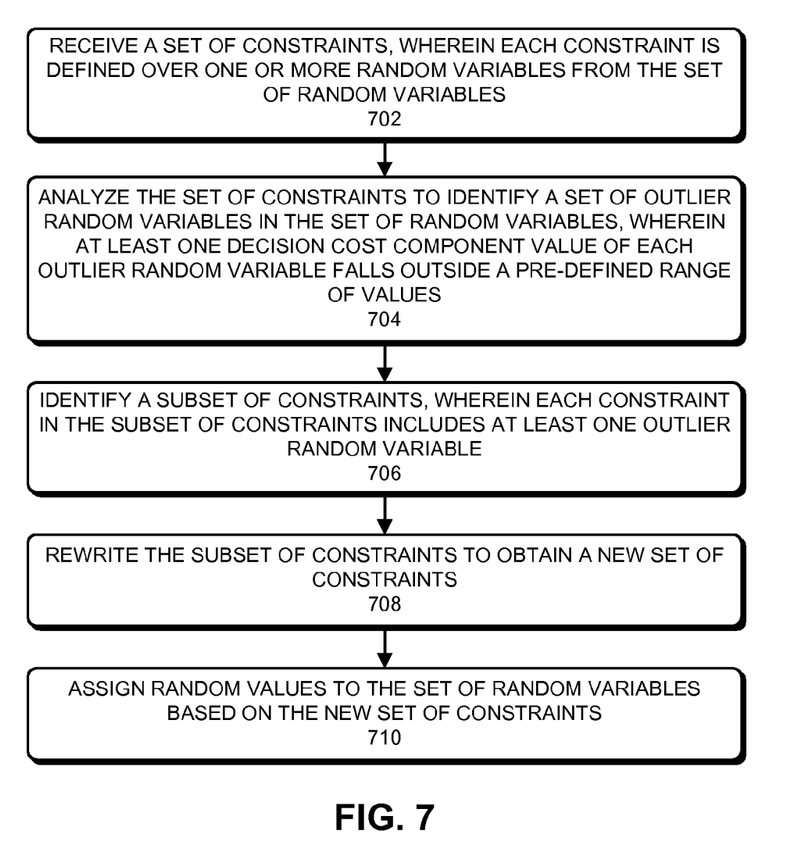
FIG. 7 presents a flowchart that illustrates a process for identifying and using outliers in accordance with some embodiments described in this disclosure.

FIG. 7 presents a flowchart that illustrates a process for identifying and using outliers in accordance with some embodiments described in this disclosure.

The process can begin by receiving a set of constraints, wherein each constraint is defined over one or more random variables from a set of random variables (block 702). The system can then analyze the set of constraints to identify a set of outlier random variables in the set of random variables, wherein at least one cost component value of each outlier random variable falls outside a pre-defined range of values (block 704).

Specifically, the system can determine cost component values for each variable. Next, the system can determine a range of cost component values that are deemed normal. For example, cost component values that are within two standard deviations of the average cost component value across all variables can be considered to be within a normal range of values. Next, the system can identify random variables that have a cost component value that falls outside the normal range of values.

Next, the system can identify a subset of constraints, wherein each constraint in the subset of constraints includes at least one outlier random variable (block 706). The system can then rewrite the subset of constraints to obtain a new set of constraints (block 708). Next, the system can assign random values to the set of random variables based on the new set of constraints (block 710).

In some embodiments, the outlier random variables can be given higher priority when an ATPG-based constraint solver assigns random values to the random variables.

Figure 8:
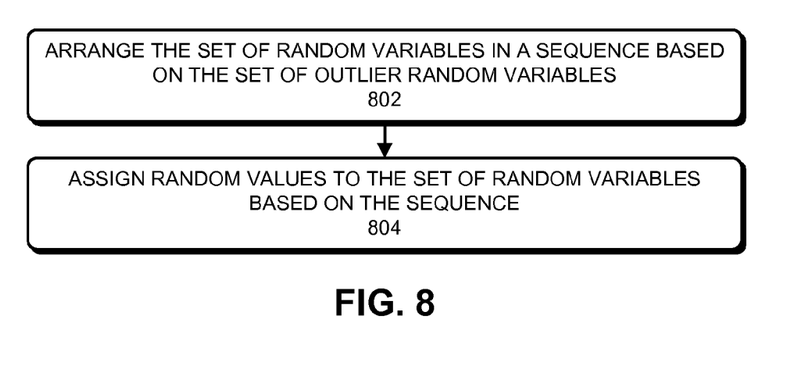
FIG. 8 illustrates a process for assigning higher priority to outlier random variables in accordance with some embodiments described in this disclosure.

FIG. 8 illustrates a process for assigning higher priority to outlier random variables in accordance with some embodiments described in this disclosure. The process can begin by arranging the set of random variables in a sequence based on the set of outlier random variables (block 802). For example, an ATPG-based constraint solver can arrange the set of random variables in a sequence according to their cost function values, and then adjust the position of the outlier random variables so that the outlier random variables are moved up in the priority order. Next, the system can assign random values to the set of random variables based on the sequence (block 804).

Figure 9:
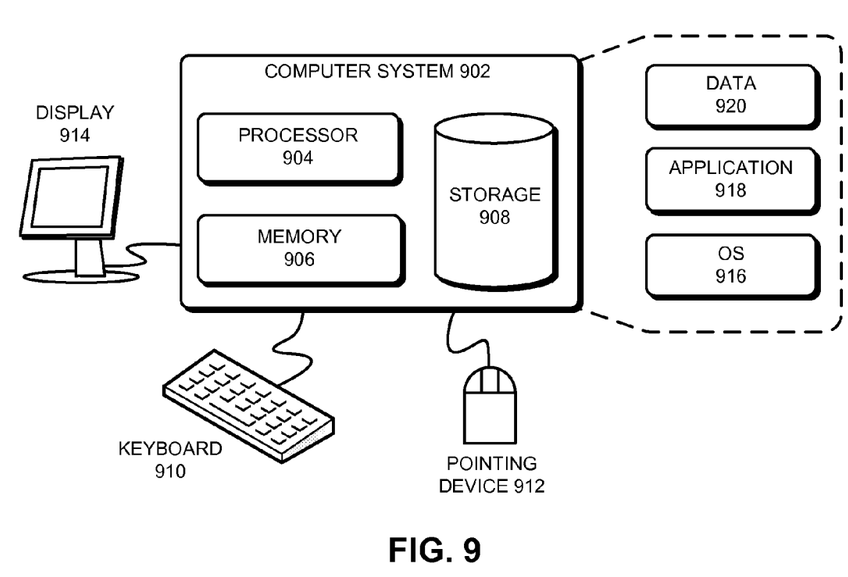
FIG. 9 illustrates a computer system in accordance with some embodiments described in this disclosure.

FIG. 9 illustrates a computer system in accordance with some embodiments described in this disclosure. Computer system 902 can include processor 904, memory 906, and storage device 908. Computer system 902 can be coupled to display device 914, keyboard 910, and pointing device 912. Storage device 908 can store operating system 916, application 918, and data 920. Data 920 can include constraints.

Computer system 902 may automatically perform any method that is implicitly or explicitly described in this disclosure. Specifically, during operation, computer system 902 can load application 918 into memory 906. Application 918 can then automatically rewrite a set of constraints to obtain a new set of constraints, and then use the new set of constraints to assign random values to a set of random variables.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) software tool in a computer, a method for assigning random values to a set of random variables based on a set of constraints, wherein each constraint in the set of constraints is defined over one or more random variables from the set of random variables, wherein the set of constraints includes one or more bit-slice constraints, and wherein each bit-slice constraint includes one or more bit-slices of one or more random variables, the method comprising:

the EDA software tool in the computer rewriting the set of constraints to obtain a new set of constraints, wherein said rewriting comprises, for at least one constraint in the set of constraints that is defined over a random variable:
    defining one or more auxiliary random variables, wherein each auxiliary random variable represents a non-overlapping bit-slice of the random variable, and
    rewriting the bit slice constraint using the random variable and the one or more auxiliary random variables; and
the EDA software tool in the computer assigning random values to the set of random variables based on the new set of constraints, wherein the set of random variables are used to generate one or more random stimuli to perform functional verification on a circuit design under verification.

2. The method of claim 1, wherein assigning random values to the set of random variables based on the new set of constraints comprises assigning random values to the one or more auxiliary random variables.

3. The method of claim 1, wherein rewriting the set of constraints to obtain the new set of constraints comprises:
    identifying a high-frequency bit-slice of a random variable that occurs more than a pre-defined number of times in the set of constraints; and
    defining a high-frequency auxiliary variable that represents the high-frequency bit-slice of the random variable.

4. A non-transitory computer-readable storage medium storing instructions of an electronic design automation (EDA) software tool that, when executed by a computer, cause the computer to perform a method for assigning random values to a set of random variables based on a set of constraints, wherein each constraint in the set of constraints is defined over one or more random variables from the set of random variables, wherein the set of constraints includes one or more bit-slice constraints, and wherein each bit-slice constraint includes one or more bit-slices of one or more random variables, the method comprising:
    rewriting the set of constraints to obtain a new set of constraints, wherein said rewriting comprises, for at least one constraint in the set of constraints that is defined over a random variable:
        defining one or more auxiliary random variables, wherein each auxiliary random variable represents a non-overlapping bit-slice of the random variable, and
        rewriting the bit-slice constraint using the random variable and the one or more auxiliary random variables; and
    assigning random values to the set of random variables based on the new set of constraints, wherein the set of random variables are used to generate one or more random stimuli to perform functional verification on a circuit design under verification.

5. The non-transitory computer-readable storage medium of claim 4, wherein assigning random values to the set of random variables based on the new set of constraints comprises assigning random values to the one or more auxiliary random variables.

6. The non-transitory computer-readable storage medium of claim 4, wherein rewriting the set of constraints to obtain the new set of constraints comprises:
    identifying a high-frequency bit-slice of a random variable that occurs more than a pre-defined number of times in the set of constraints; and
    defining a high-frequency auxiliary variable that represents the high-frequency bit-slice of the random variable.

7. An electronic design automation (EDA) system, comprising:
    a processor; and
    a non-transitory computer-readable storage medium storing instructions that, when executed by the processor, cause the EDA system to perform a method for assigning random values to a set of random variables based on a set of constraints, wherein each constraint in the set of constraints is defined over one or more random variables from the set of random variables, wherein the set of constraints includes one or more bit-slice constraints, and wherein each bit-slice constraint includes one or more bit-slices of one or more random variables, the method comprising:
        rewriting the set of constraints to obtain a new set of constraints, wherein said rewriting comprises, for at least one constraint in the set of constraints that is defined over a random variable:
            defining one or more auxiliary random variables, wherein each auxiliary random variable represents a non-overlapping bit-slice of the random variable, and
            rewriting the bit-slice constraint using the random variable and the one or more auxiliary random variables; and
        assigning random values to the set of random variables based on the new set of constraints, wherein the set of random variables are used to generate one or more random stimuli to perform functional verification on a circuit design under verification.

8. The EDA system of claim 7, wherein assigning random values to the set of random variables based on the new set of constraints comprises assigning random values to the one or more auxiliary random variables.

9. The EDA system of claim 7, wherein rewriting the set of constraints to obtain the new set of constraints comprises:
    identifying a high-frequency bit-slice of a random variable that occurs more than a pre-defined number of times in the set of constraints; and
defining a high-frequency auxiliary variable that represents the high-frequency bit-slice of the random variable.

* * * * *